US011132567B2

(12) United States Patent
Jakubiak et al.

(10) Patent No.: US 11,132,567 B2
(45) Date of Patent: Sep. 28, 2021

(54) METHOD FOR AUTHENTICATING USER AND ELECTRONIC DEVICE THEREOF

(71) Applicant: Samsung Electronics Co., Ltd., Suwon-si (KR)

(72) Inventors: Antoni Jakubiak, Warsaw (PL); Daniel Trofimiuk, Warsaw (PL); Pawel Kies, Warsaw (PL); Jakub Tkaczuk, Warsaw (PL); Lukasz Kornatowski, Warsaw (PL); Michal Tarnowski, Warsaw (PL); Piotr Zyskowski, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 16/692,981

(22) Filed: Nov. 22, 2019

(65) Prior Publication Data

US 2020/0218915 A1 Jul. 9, 2020

(30) Foreign Application Priority Data

Jan. 8, 2019 (KR) .......................... 10-2019-0002357

(51) Int. Cl.
*G06K 9/00* (2006.01)
*G06K 9/20* (2006.01)
*G06F 21/32* (2013.01)

(52) U.S. Cl.
CPC ......... *G06K 9/00899* (2013.01); *G06F 21/32* (2013.01); *G06K 9/00255* (2013.01); *G06K 9/00288* (2013.01); *G06K 9/00604* (2013.01); *G06K 9/00617* (2013.01); *G06K 9/2027* (2013.01)

(58) Field of Classification Search
CPC ....................................................... G06F 21/32
See application file for complete search history.

(56) References Cited

U.S. PATENT DOCUMENTS

| 8,046,721 B2 | 10/2011 | Chaudhri et al. |
| 8,136,053 B1 | 3/2012 | Miller et al. |
| 9,280,652 B1 | 3/2016 | Bozarth |
| 2006/0212718 A1 | 9/2006 | Senga |

(Continued)

OTHER PUBLICATIONS

Pacut et al., "Aliveness Detection for Iris Biometrics", 2006 IEEE International Carnahan Conference on Security Technology, Oct. 2006, 8 pages.

(Continued)

*Primary Examiner* — Edward Park

(57) ABSTRACT

Various embodiments of the disclosure relate to devices and methods for user authentication on an electronic device. The electronic device comprises a plurality of lighting devices, a camera, a display, and a processor. The processor is configured to display an object on the display, obtain, through the camera, a plurality of images based on an image obtaining pattern randomly generated, obtain biometric information using at least one of the plurality of images, obtain information about a variation in a user's gaze corresponding to a movement of the object displayed on the display using the plurality of images, and perform authentication on the user based on the biometric information and the user gaze variation information. Other embodiments are available as well.

17 Claims, 13 Drawing Sheets

(56) References Cited

U.S. PATENT DOCUMENTS

| | | | |
|---|---|---|---|
| 2007/0165244 A1 | 7/2007 | Yukhin et al. | |
| 2015/0294464 A1* | 10/2015 | Kim .................. | G06K 9/00597 |
| | | | 382/117 |
| 2016/0062456 A1* | 3/2016 | Wang ................ | G06K 9/00604 |
| | | | 382/117 |
| 2017/0351929 A1 | 12/2017 | Kim | |
| 2018/0018514 A1 | 1/2018 | Azam et al. | |
| 2018/0039990 A1 | 2/2018 | Lindemann | |
| 2018/0121639 A1 | 5/2018 | Liu et al. | |
| 2018/0196998 A1* | 7/2018 | Price .................. | G06K 9/00255 |
| 2019/0034606 A1* | 1/2019 | Mapen ................. | G06F 21/32 |
| 2020/0218915 A1* | 7/2020 | Jakubiak ............ | G06K 9/00604 |

OTHER PUBLICATIONS

Choi et al., "Aliveness Detection of Fingerprints using Multiple Static Features", International Journal of Biological and Medical Sciences, vol. 2, No. 3, 2007, pp. 200-205.
Szwoch et al., "Eye Blink Based Detection of Liveness in Biometric Authentication Systems Using Conditional Random Fields", International Conference on Computer Vision and Graphics (ICCVG 2012), Sep. 2012, 2 pages.
Kar et al., "A Review and Analysis of Eye-Gaze Estimation Systems, Algorithms and Performance Evaluation Methods in Consumer Platforms", IEEE Access, vol. 5, Aug. 2017, pp. 16495-16519.
Kohlmeyer, "Picture Perception Lab: A program for picture perception experiments on the Macintosh II", Behavior Research Methods, Instruments, & Computers, vol. 24, No. 1, Mar. 1992, pp. 67-71.
"Iris recognition", Wikipedia, Nov. 17, 2019, 9 pages.
"Touch Id", Wikipedia, Nov. 5, 2019, 6 pages.
"Facial recognition system", Wikipedia, Nov. 19, 2019, 21 pages.
"Face ID", Wikipedia, Nov. 18, 2019, 5 pages.
Hackett, "Apple Acquires Eye-Tracking Tech Firm for Augmented Reality", Fortune, Jun. 27, 2017, 2 pages.
"Phone Theft in America: What really happens when your phone gets grabbed", Lookout Blog, May 7, 2014, 6 pages.
Brandom, "Your phone's biggest vulnerability is your fingerprint", The Verge, May 2, 2016, 4 pages.
Gartenberg, "Hacker beats Galaxy S8 iris scanner using an IR image and a contact lens", The Verge, May 23, 2017, 3 pages.
Dinside, "How to hack the facial recognition on Galaxy S8 with a picture", YouTube, Apr. 11, 2017, 1 page. Available online at: https://www.youtube.com/Watch?v=sI6ofhWpfMU.
"Pupillary response", Wikipedia, Nov. 13, 2019, 2 pages.
Greenberg, "Hackers Say They've Broken Face ID a Week After iPhone X Release", Wired, Nov. 12, 2017, 7 pages.
Wehner, "The Galaxy S8's iris scanner gets hacked by a piece of paper and a contact lens", BGR, May 23, 2017, 2 pages.
"Eye tracking", Wikipedia, Nov. 18, 2019, 12 pages.
Metz, "Control Your Smartphone with Your Eyes", MIT Technology Review, Jul. 1, 2016, 2 pages.
"Android Ice Cream Sandwich", Wikipedia, Sep. 5, 2019, 6 pages.
"Face Unlock: A Deep Dive", OnePlus, Nov. 20, 2017, 11 pages.
Boyle, "Mobile Privacy Tip #1—Use a Security Code to Lock Your Phone", TrendMicro, Aug. 16, 2013, 3 pages.
Wagoner, "10 best ways to secure your smartphone", Android Central, Sep. 1, 2014, 12 pages.
International Search Report dated Mar. 13, 2020 in connection with International Patent Application No. PCT/KR2019/017204, 3 pages.
Written Opinion of the International Searching Authority dated Mar. 13, 2020 in connection with International Patent Application No. PCT/KR2019/017204, 5 pages.

\* cited by examiner

METHOD FOR AUTHENTICATING USER AND ELECTRONIC DEVICE THEREOF

CROSS-REFERENCE TO RELATED APPLICATION

This application is based on and claims priority under 35 U.S.C. 119 to Korean Patent Application No. 10-2019-0002357, filed on Jan. 8, 2019, in the Korean Intellectual Property Office, the disclosure of which is herein incorporated by reference in its entirety.

BACKGROUND

1. Field

The disclosure relates to user authentication of electronic devices and, more particularly, to devices and methods for obtaining biometric information using a light source of an electronic device which randomly emits light.

2. Description of Related Art

With information technology (IT) and semiconductor technology developing, various electronic devices are evolving into multimedia devices capable of providing multimedia services. Multimedia services may include at least one of voice call services, messaging services, broadcasting services, wireless internet services, camera services, electronic payment services, or music playing services.

As multimedia services are diversified, electronic devices may tend to retain more personal information. Also increasing is the use of payment services on electronic devices. Accordingly, electronic devices may provide various authentication services to protect personal information or payment information retained therein from other people. Authentication services provided by electronic devices may include at least one of PIN code entry, pattern entry, or biometric recognition which uses a user's biometric information.

An electronic device may authenticate the user using biometric information, such as the user's fingerprint, iris, or face.

When fingerprint scanning (or fingerprint recognition) is used, the electronic device may authenticate the user based on the similarity between the user's fingerprint image obtained by a fingerprint sensor and a pre-defined reference fingerprint image. The fingerprint images may include information about the ridges and valleys of the human body which have contacted the fingerprint sensor.

When iris scanning (or iris recognition) is used, the electronic device may authenticate the user based on the similarity between the user's iris image obtained via an infrared (IR) camera and a pre-defined reference iris image.

When face scanning (or face recognition) is used, the electronic device may authenticate the user based on the similarity between the features of the user's facial image obtained through a camera and a pre-defined reference facial image. The features of the facial image may include such features as the inter-eye interval and the distance between the nose and the lips.

However, the fingerprint sensor cannot differentiate fingerprints copied in a material similar in shape or property to the finger skin (or human body skin). Scanners used for iris scanning cannot differentiate iris images which have been output in three dimensions (3D). The electronic device cannot differentiate between facial images printed in two dimensions (2D) or 3D and the user's actual facial images. In other words, the electronic device is unable to determine whether the biometric information obtained for user authentication has been obtained from the actual user or a fake. Thus, electronic devices have poor security for user authentication.

The above information is presented as background information only to assist with an understanding of the disclosure. No determination has been made, and no assertion is made, as to whether any of the above might be applicable as prior art with regard to the disclosure.

SUMMARY

According to an embodiment of the disclosure, there may be provided a device and method for increasing the accuracy of biometrics on an electronic device.

According to an embodiment of the disclosure, there may be provided a device and method for an electronic device to determine whether biometric information has been obtained from the actual user.

Objects of the disclosure are not limited to the foregoing, and other unmentioned objects would be apparent to one of ordinary skill in the art from the following description.

According to an embodiment, an electronic device comprises a plurality of lighting devices, a camera, a display, and a processor configured to display an object on the display, obtain, through the camera, a plurality of images based on an image obtaining pattern randomly generated, obtain biometric information using at least one of the plurality of images, obtain information about a variation in a user's gaze corresponding to a movement of the object displayed on the display using the plurality of images, and perform authentication on the user based on the biometric information and the user gaze variation information.

According to an embodiment, a method for operating an electronic device comprises displaying an object on a display of the electronic device, obtaining a plurality of images based on an image obtaining pattern randomly generated, obtaining biometric information using at least one of the plurality of images, obtaining information about a variation in a user's gaze corresponding to a movement of the object displayed on the display using the plurality of images, and performing authentication on the user based on the biometric information and the user gaze variation information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
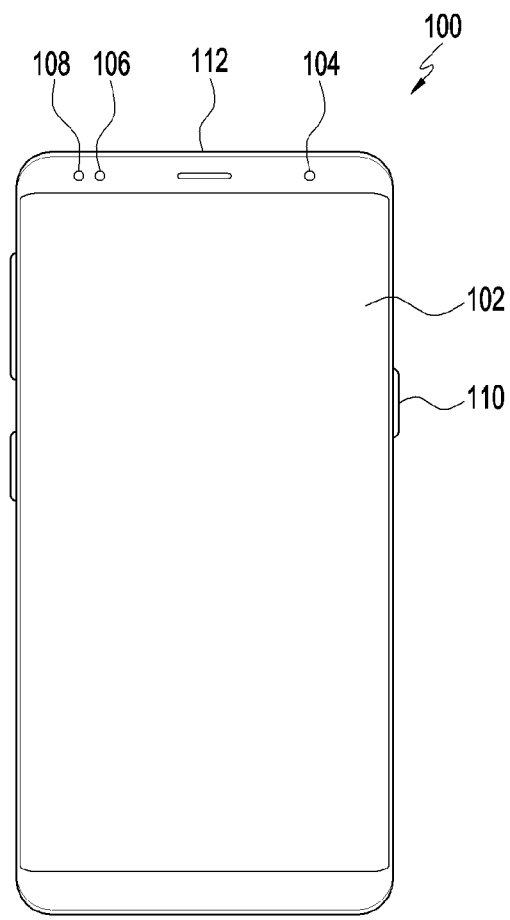
FIG. 1 illustrates a perspective view of an electronic device according to an embodiment.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skill in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing device, the instructions executed through a processor of a computer or other programmable data processing device generate means for performing the functions described in connection with a block(s) of each flowchart. Since the computer program instructions may be stored in a computer-available or computer-readable memory that may be oriented to a computer or other programmable data processing device to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing device, instructions that generate a process executed by a computer as a series of operational steps are performed by the computer or other programmable data processing device which operate the computer or other programmable data processing device and may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed simultaneously or in a reverse order depending on corresponding functions.

As used herein, the term "module" or "unit" means a software element or a hardware element such as a field-programmable gate array (FPGA) or an application specific integrated circuit (ASIC). A module or unit plays a certain role. However, the term "module" or "unit" is not limited as meaning a software or hardware element. A "module" or "unit" may be configured in a storage medium that may be addressed or may be configured to reproduce by one or more processors. Accordingly, as an example, a "module" or "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a "module" or "unit" may be combined with additional elements or may be split into sub elements or sub modules or sub units. Further, an element or a "module" or "unit" may be implemented to reproduce by one or more CPUs in a device or a security multimedia card.

Although the terms "first" and "second" are used to describe various components, the components are not limited by the terms. These terms are provided simply to distinguish one component from another. Accordingly, the first component mentioned herein may also be the second component within the technical spirit of the disclosure.

In the following description, the electronic devices may be various types of devices. For example, the electronic devices may include at least one of, e.g., a portable communication device (e.g., a smartphone), a computer device, a portable multimedia device, a camera, a wearable device, or a home appliance. According to an embodiment of the disclosure, the electronic devices are not limited to those described above.

FIG. 1 illustrates a perspective view of an electronic device according to an embodiment.

Referring to FIG. 1, an electronic device 100 may include a display 102 that is exposed to the outside through a front plate facing in a first direction of a housing. For example, the housing may be formed of a conductive member and/or a non-conductive member.

According to an embodiment, the electronic device 100 may include a call receiver hole 112. A speaker device to output sound received from the other party may be disposed inside the call receiver hole 112.

According to an embodiment, the electronic device 100 may include components that are disposed to be exposed through the display 102 or perform functions through the front plate without being exposed to the outside to perform various functions of the electronic device 100. For example, the components may include a first lighting device 104 which is disposed on a side of the call receiver hole 112 to emit light beams with unique characteristics (e.g., a pattern). As an example, the first lighting device 104 may include a structure lighting device (or structured light) to emit a unique pattern of light (e.g., infrared (IR) light) to allow a depth image to be obtained by the camera 108. For example, the components may include a second lighting device 106 which is disposed on another side of the call receiver hole 112 to emit light beams evenly over a broad area. As an example, the second lighting device 106 may include a flood lighting device to constantly emit light beams (e.g., IR rays) for iris or face scanning. For example, the components may include a camera 108. As an example, the camera 108 may include a camera (e.g., an IR camera) capable of obtaining a facial image or depth image containing an iris. As an example, face scanning may include two-dimensional (2D) face scanning and three-dimensional (3D) face scanning.

According to an embodiment, the electronic device 100 may include at least one key input device 110. For example, the key input device 110 may include volume control buttons, a power button, or buttons for performing particular functions (e.g., the functions of running artificial intelligence (AI) or entering quick speech recognition execution mode) on a side surface of the housing.

Figure 2:
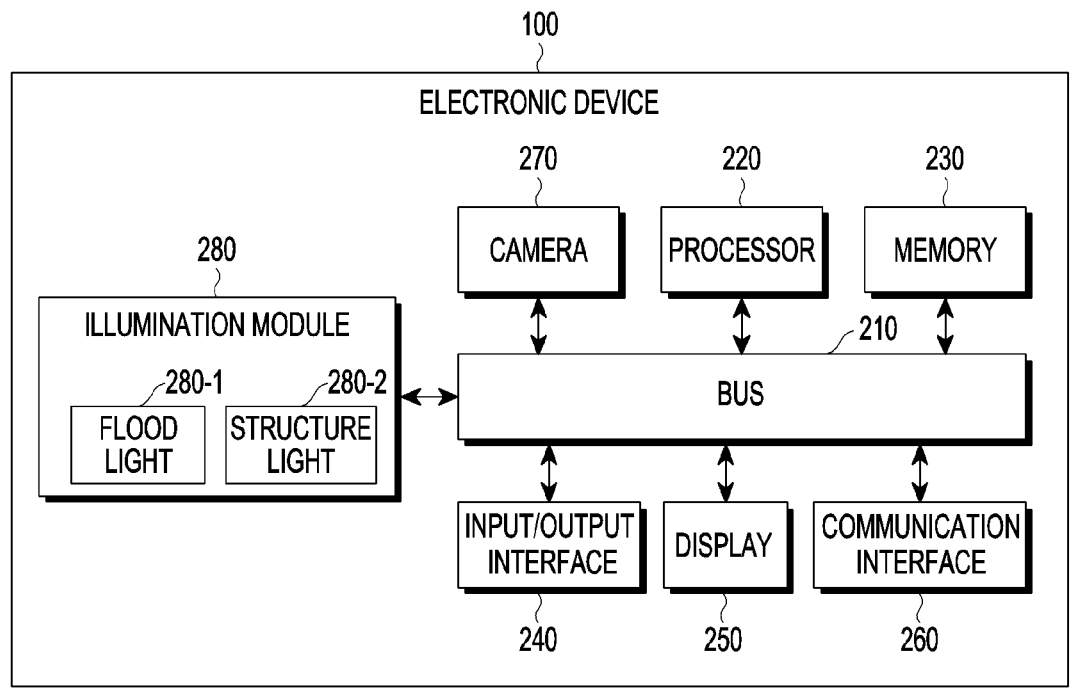
FIG. 2 illustrates a block diagram of an electronic device according to an embodiment.

FIG. 2 illustrates a block diagram of an electronic device according to an embodiment.

Referring to FIG. 2, the electronic device 100 may include at least one of a bus 210, a processor 220, a memory 230, an input/output interface 240, a display 250, a communication interface 260, a camera 270, or an illumination module 280. In some embodiments, the electronic device 100 may exclude at least one of the components or may add another component. As an example, the input/output interface 240 and the communication interface 260 may be omitted from the components of the electronic device 100 of FIG. 2.

The bus 210 may include circuitry for, e.g., connecting the components 220 to 280 with one another and transferring signals (e.g., control messages and/or data) between the components.

The processor 220 may include one or more of a central processing unit (CPU), an application processor (AP), a communication processor (CP), or an image signal processor (ISP). For example, the processor 220 may perform control on at least one of the other components of the electronic device 100 and/or perform an operation or data processing relating to communication.

According to an embodiment, upon detecting an occurrence of a user authentication event, the processor 220 may perform control to allow the camera 270 and the illumination module 280 to synchronize with each other based on an image obtaining pattern that randomly occurs. For example, the user authentication event may occur based on at least one of entry of the power button, reception of an activation command (e.g., a voice command), grabbing the electronic device 100, or a variation in the charging state of the electronic device 100. The image obtaining pattern may include at least one of an image obtaining order or an image obtaining time. As an example, the image obtaining order and the image obtaining time may randomly be generated at the time of occurrence of the user authentication event. As an example, the image obtaining order may randomly be generated at the time of occurrence of the user authentication event, and the image obtaining time may randomly be generated at a time of failure in user authentication. As an example, the image obtaining order may include the order and times of illumination of the structure lighting device and the flood lighting device.

According to an embodiment, the processor 220 may perform user authentication based on user information obtained through the camera 270 and the illumination module 280. For example, the processor 220 may obtain a facial image through the camera 270 at the time of illumination of the flood lighting device 280-1. The processor 220 may obtain a depth image through the camera 270 at the time of illumination of the structure lighting device 280-2. The processor 220 may perform biometric scanning on the user using the facial image. As an example, the processor 220 may perform iris scanning using an iris image contained in the facial image. As an example, the processor 220 may perform face scanning using feature information extracted from the facial image. When the biometric scanning on the user is successful, the processor 220 may detect a gaze vector corresponding to a change in the user's gaze using the facial image and the depth image. When the gaze vector matches a movement of a gaze object displayed on the display 250, the processor 220 may determine that the user authentication is successful. As an example, the gaze object may be displayed on at least part of the display 250 to lead the user's gaze at the time of detecting the occurrence of the user authentication event. The gaze object may be moved randomly or based on a pre-defined rule. Upon failure in the user authentication or biometric scanning on the user, the processor 220 may re-obtain the user's facial image and depth image based on the image obtaining pattern.

The memory 230 may store commands or data related to at least one other component of the electronic device 100. For example, the memory 230 may include a volatile and/or non-volatile memory embedded in the electronic device 100. For example, the memory 230 may include an external memory functionally connected with the electronic device 100. As an example, the external memory may include at least one of a server (e.g., a cloud) or a memory card.

The input/output interface 240 may transfer commands or data input from the user or other external device to other component(s) of the electronic device 100 or may output commands or data received from other component(s) of the electronic device 100 to the user or other external devices. For example, the input/output interface 240 may include at least one physical button, such as a home button, a power button, and volume control buttons. For example, the input/output interface 240 may include a speaker to output audio signals and a microphone to gather audio signals.

The display 250 may display various contents (e.g., text, images, videos, icons, or symbols) to the user. For example, the display 250 may include a touchscreen. The touchscreen may receive, for example, a touch input, gesture input, proximity or hovering input using an electronic pen or a body portion of the user.

The communication interface 260 may establish communication between the electronic device 100 and an external device (e.g., other electronic devices or a server). For example, the communication interface 260 may be connected with a network via wireless or wired communication to communicate with the external device.

The camera 270 may gather image information about an object to capture a still image (photo) and video. For example, the camera 270 may transfer data (e.g., an image) gathered or captured to the display 250 and the processor 220. For example, the camera 270 may include at least one of an image sensor, a lens, an image signal processor (ISP), or a flash (e.g., a light emitting diode (LED) or xenon lamp). For example, the camera 270 may include a plurality of cameras disposed on the front or rear surface of the electronic device 100. As an example, the camera 270 may include at least one infrared (IR) camera disposed on the front surface of the electronic device 100.

The illumination module 280 may emit light to assist in recognizing the object. For example, the illumination module 280 may include a flood lighting device 280-1 and a structure lighting device 280-2 disposed on the front surface of the electronic device 100. The flood lighting device 280-1 may emit a predetermined size of light to allow the camera 270 to obtain the user's facial image. The structure lighting device 280-2 may emit a unique characteristic (e.g., pattern) of light to allow the camera 270 to obtain a depth image of the user's face. As an example, at least one of the flood lighting device 280-1 or the structure lighting device 280-2 may adopt a near-infrared (NIR) wavelength of light (e.g., 850 mm or 940 mm).

Figure 3:
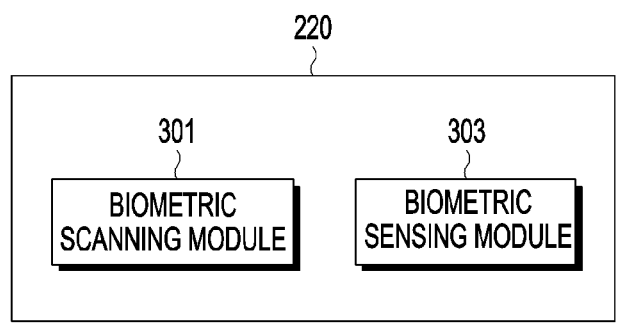
FIG. 3 illustrates a block diagram of a processor for user authentication according to an embodiment.

FIG. 3 illustrates a block diagram of a processor for user authentication according to an embodiment. In the following description, the processor 220 may include the processor 220 of FIG. 2 or at least part of the processor 220 of FIG. 2.

Referring to FIG. 3, the processor 220 may perform user authentication through a biometric scanning module 301 and a biometric sensing module 303.

According to an embodiment, the biometric scanning module 301 may perform biometric scanning on the user using an image obtained through the camera 270 at the time of illumination of the flood lighting device 280-1. For example, when iris scanning is performed, the biometric scanning module 301 may detect a facial area from the image obtained through the camera 270 at the time of illumination of the flood lighting device 280-1. The biometric scanning module 301 may perform iris scanning on the user based on the similarity between the iris image contained in the facial area and a reference iris image pre-stored in the memory 230. As an example, when the similarity in iris image exceeds a reference value, the biometric scanning module 301 may determine that the iris scanning on the user succeeds. As an example, when no facial image is detected from the image obtained through the camera 270 or when the similarity in iris image is the reference value or less, the biometric scanning module 301 may determine that the iris scanning on the user fails. For example, when face scanning is performed, the biometric scanning module 301 may identify whether a face exists in an image obtained through the camera 270 at the time of illumination of the flood lighting device 280-1. As an example, the biometric scanning module 301 may extract feature points in the image and determine whether there are feature points corresponding to the eyes, nose, and mouth. The biometric scanning module 301 may perform face scanning on the user based on the similarity between a feature point in the face included in the image and a feature point in a reference facial image pre-stored in the memory 230. The feature points of a face may include, e.g., the inter-eye interval, the contour of the face, and the distance between the nose and the lips. As an example, when the similarity in facial feature point exceeds a reference value, the biometric scanning module 301 may determine that the face scanning on the user succeeds. As an example, when no face is detected from the image obtained through the camera 270 or when the similarity in facial feature point is the reference value or less, the biometric scanning module 301 may determine that the face scanning on the user fails.

According to an embodiment, the biometric sensing module 303 may determine whether information used for biometric scanning in the biometric scanning module 301 is information obtained from the actual user. For example, when an occurrence of a user authentication event is detected, the biometric sensing module 303 may control the display 250 to display a gaze object on at least part of the display 250. The biometric sensing module 303 may detect a three-dimensional (3D) face mesh using an image obtained through the camera 270 at the time of illumination of the flood lighting device 280-1 and a depth image obtained through the camera 270 at the time of illumination of the structure lighting device 280-2. The biometric sensing module 303 may detect the user's gaze vector based on the 3D face mesh and the image obtained through the camera 270 at the time of illumination of the flood lighting device 280-1. When a movement of the gaze object displayed on the display 250 matches the gaze vector, the biometric sensing module 303 may determine that the information used for biometric scanning in the biometric scanning module 301 has been obtained from the actual user.

According to an embodiment, the biometric scanning module 301 and the biometric sensing module 303 may be driven independently or in parallel. When biometric scanning by the biometric scanning module 301 succeeds and the information used for biometric scanning in the biometric scanning module 301 is determined through the biometric sensing module 303 to be information obtained from the actual user, the processor 220 may determine that user authentication succeeds.

According to an embodiment, when biometric scanning through the biometric scanning module 301 succeeds, the biometric sensing module 303 may determine whether information used for biometric scanning in the biometric scanning module 301 is information obtained from the actual user.

According to an embodiment, when the information to be used for biometric scanning is determined through the biometric sensing module 303 to be information obtained from the actual user, the biometric scanning module 301 may perform biometric scanning.

According to an embodiment, the electronic device 100 may randomly apply illumination patterns (or image obtaining patterns) of the light necessary to obtain biometric information so as to increase the security of user authentication using biometric information. Therefore, the image obtaining time (time of capture) of the camera 270 needs to be synchronized with the time of illumination of the illumination module 280.

Figure 4A:
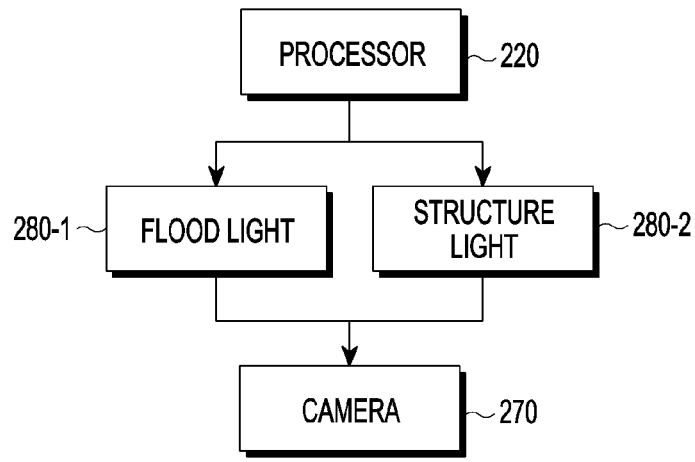
FIGS. 4A, 4B, and 4C illustrate block diagrams of an electronic device to transmit a sync signal according to an embodiment.
Figure 4B:
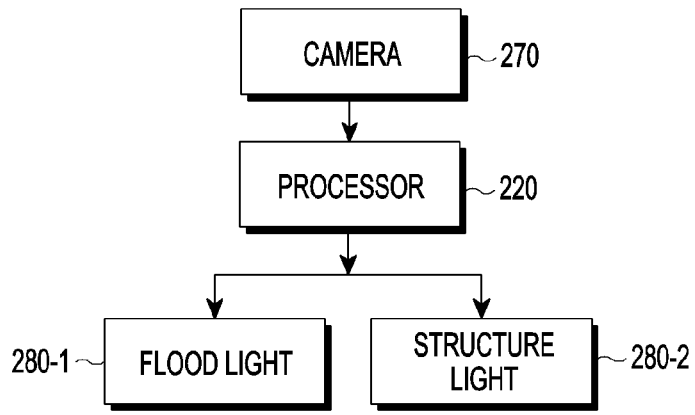
Figure 4C:
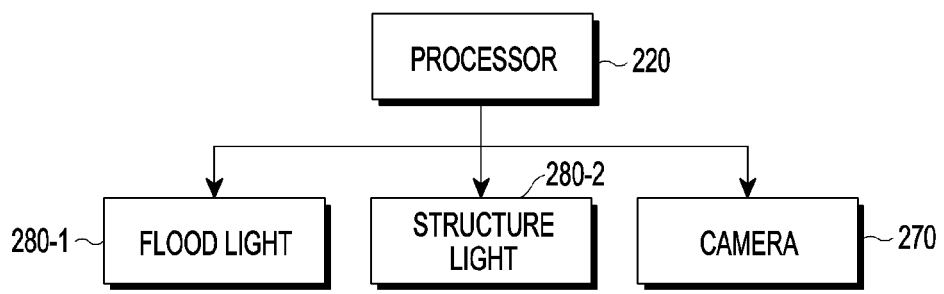

FIGS. 4A, 4B, and 4C illustrate block diagrams of an electronic device to transmit a sync signal according to an embodiment.

According to an embodiment, referring to FIG. 4A, the processor 220 may transmit a sync signal to the flood lighting device 280-1 or structure lighting device 280-2 at the time of illumination (or the time of obtaining an image) of each light based on an illumination pattern (or an image obtaining pattern) randomly generated. As an example, the processor 220 may transmit a sync signal to the flood lighting device 280-1 at the time of illumination (or the time of obtaining a facial image) of the flood lighting device 280-1 and may transmit a sync signal to the structure lighting device 280-2 at the time of illumination (or the time of obtaining a depth image) of the structure lighting device 280-2. The flood lighting device 280-1 or the structure lighting device 280-2 may emit light based on the sync signal received from the processor 220. As an example, the flood lighting device 280-1 may emit a near infrared wavelength of light upon receiving the sync signal from the processor 220 at a first time. In this case, the flood lighting device 280-1 may output the sync signal to the camera 270. As an example, the structure lighting device 280-2 may emit a particular pattern of light upon receiving the sync signal from the processor 220 at a second time. In this case, the structure lighting device 280-2 may output the sync signal to the camera 270. Upon receiving the sync signal from the flood lighting device 280-1 or the structure lighting device 280-2, the camera 270 may capture an image.

According to an embodiment, referring to FIG. 4B, the camera 270 may output a sync signal to the processor 220 at the time of obtaining an image based on an illumination pattern (or an image obtaining pattern) randomly generated. The processor 220 may transmit a sync signal to the flood lighting device 280-1 or the structure lighting device 280-2 based on the sync signal received from the camera 270. As an example, the processor 220 may transmit a sync signal to the flood lighting device 280-1 at the time of obtaining a facial image by the camera 270 and may transmit a sync signal to the structure lighting device 280-2 at the time of obtaining a depth image by the camera 270. The flood lighting device 280-1 or the structure lighting device 280-2 may emit light based on the sync signal received from the processor 220.

According to an embodiment, as shown in FIG. 4C, the processor 220 may transmit sync signals to any one of the flood lighting device 280-1 or structure lighting device 280-2 and the camera 270 at the time of illumination (or the time of obtaining an image) of each light based on an illumination pattern (or an image obtaining pattern) randomly generated. As an example, the processor 220 may transmit sync signals to the flood lighting device 280-1 and the camera 270 at the time of illumination (or the time of obtaining a facial image) of the flood lighting device 280-1. The processor 220 may transmit sync signals to the structure lighting device 280-2 and the camera 270 at the time of illumination (or the time of obtaining a depth image) of the structure lighting device 280-2. The flood lighting device 280-1 or the structure lighting device 280-2 may emit light based on the sync signal received from the processor 220. Upon receiving the sync signal from the processor 220, the camera 270 may capture an image.

According to an embodiment, the camera 270 may continuously or periodically obtain images regardless of sync signals. In this case, the processor 220 may determine that images obtained at the time when no light is emitted from any one of the flood lighting device 280-1 and the structure lighting device 280-2 among images obtained through the camera 270 are unreliable. The images determined to be unreliable are excluded from biometric authentication.

Figure 5A:
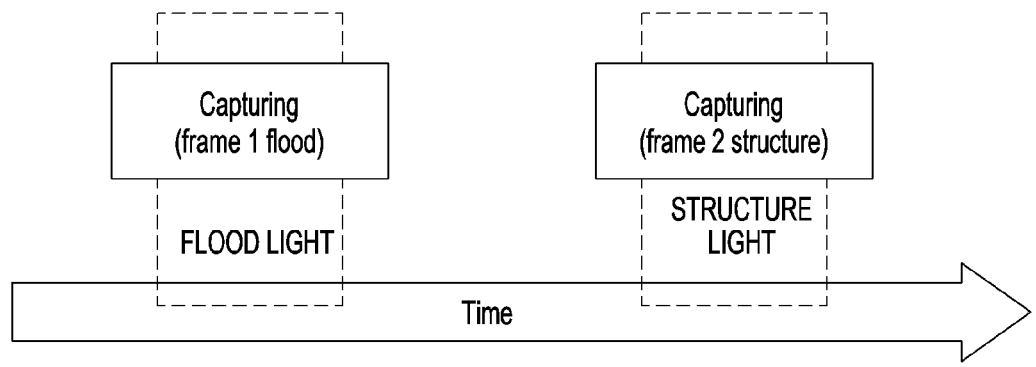
FIGS. 5A and 5B illustrate views of the relationship between the time of capture by a camera and the time of illumination by a lighting device according to an embodiment.
Figure 5B:
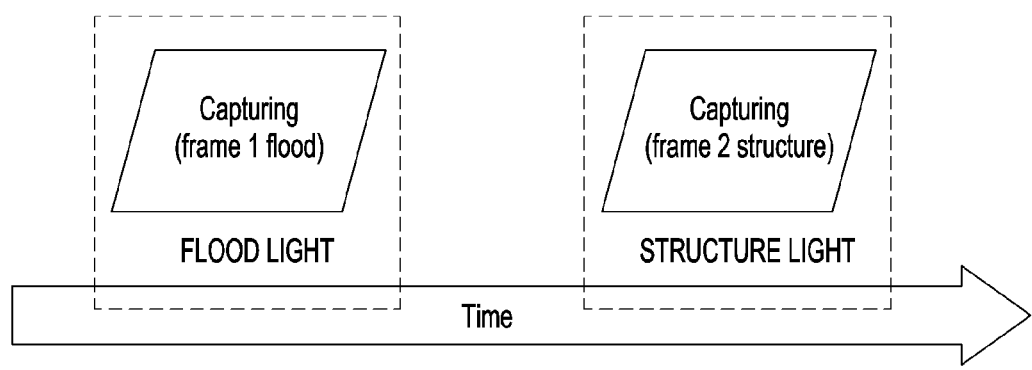

FIGS. 5A and 5B illustrate views of the relationship between the time of capture by a camera and the time of illumination by a lighting device according to an embodiment. The relationship between the time of capture by the camera 270 of FIG. 2 and the time of illumination of the illumination module 280 of FIG. 2 is described below. Here, the time of capture may denote the time taken to obtain at least one image through the camera 270. The time of illumination may denote duration during which the illumination module 280 emits light.

According to an embodiment, referring to FIG. 5A, when the camera 270 adopts a global shutter scheme, the time of illumination of the illumination module 280 may be set to be shorter than the time of capture of the camera 270. As an example, the times of illumination of the flood lighting device 280-1 and the structure lighting device 280-2 may be set to be shorter than the time of capture of the camera 270 adopting the global shutter scheme. When adopting the global shutter scheme, reducing the time of illumination of the illumination module 280 in the electronic device 100 may mitigate motion blur, thereby enhancing depth calculation, and performance of gaze tracking. Here, the global shutter scheme may indicate a scheme of obtaining an image by simultaneously exposing all the pixels in the camera 270.

According to an embodiment, referring to FIG. 5B, when the camera 270 adopts a rolling shutter scheme, the time of illumination of the illumination module 280 may be set to be equal to or longer than the time of capture of the camera 270. As an example, the times of illumination of the flood lighting device 280-1 and the structure lighting device 280-2 may be set to be equal to or longer than the time of capture of the camera 270 adopting the global shutter scheme. Here, the rolling shutter scheme may indicate a scheme of obtaining an image by sequentially exposing the pixels in the camera 270 by the column or by the row.

Figure 6:
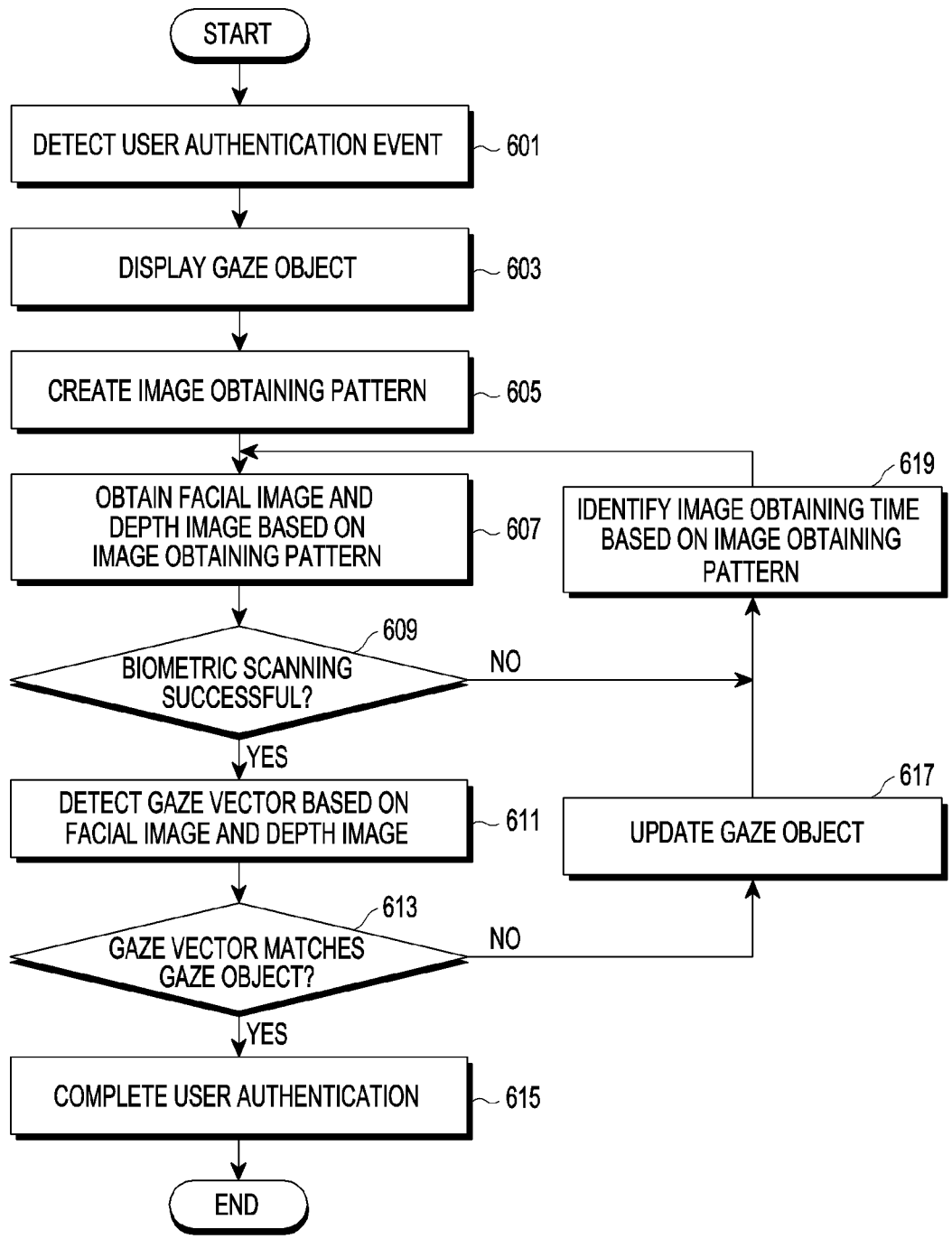
FIG. 6 illustrates a flowchart of an example of user authentication on an electronic device according to an embodiment.
Figures 7A, 7B:
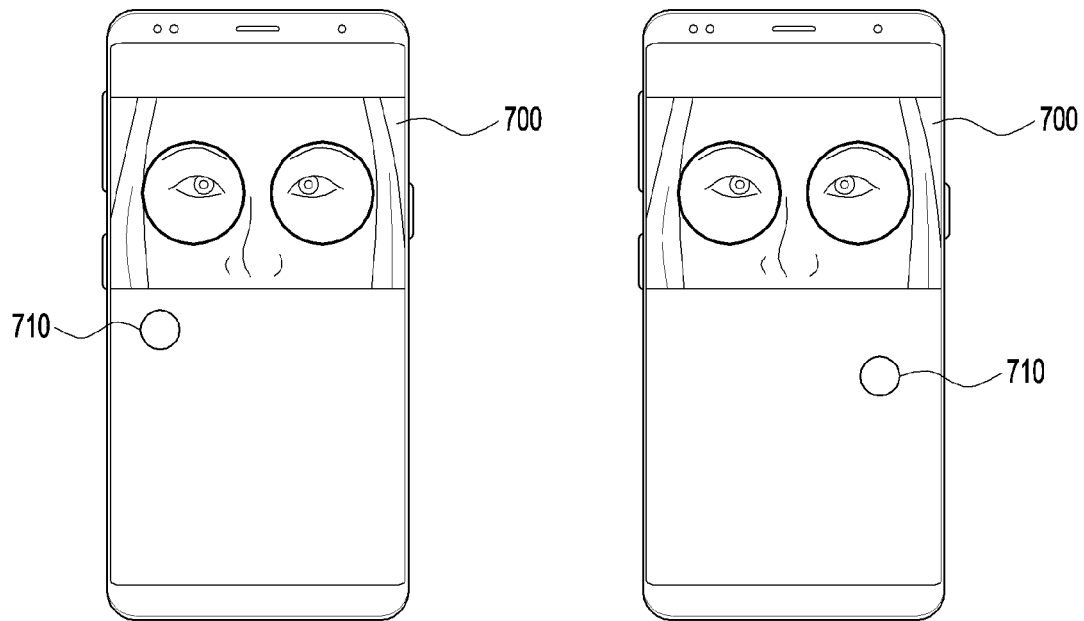
FIGS. 7A and 7B illustrate views of screen configurations for iris scanning on an electronic device according to an embodiment.

FIG. 6 illustrates a flowchart of an example of user authentication on an electronic device according to an embodiment. FIGS. 7A and 7B illustrate views of screen configurations for iris scanning on an electronic device according to an embodiment. In the following description, the electronic device may include the electronic device 100 of FIG. 2 or at least part (e.g., the processor 220) of the electronic device 100.

Referring to FIG. 6, the electronic device may detect an occurrence of a user authentication event in operation 601. For example, when detecting entry of the power button, receiving an activation command (e.g., a voice command), detecting a grabbing of the electronic device 100, or detecting a change in the charging state of the electronic device 100, the processor 220 may determine that a user authentication event occurs.

The electronic device may display a gaze object to lead the user's gaze in operation 603. For example, when performing iris scanning-based user authentication, the processor 220 may control the display 250 to display a gaze object 710 and a user image 700 for iris scanning as shown in FIG. 7A. The gaze object may be displayed to overlap at least part of the user image 700 for iris scanning. As an example, the gaze object 710 may be moved randomly or as per a pre-determined rule as shown in FIG. 7B. As an example, the gaze object 710 may be fixed.

The electronic device may randomly generate an image obtaining pattern in operation 605. The image obtaining pattern may include an order and times of obtaining a facial image and a depth image for user authentication.

The electronic device may obtain a facial image and a depth image based on the order of obtaining images of the image obtaining pattern randomly generated, in operation 607. For example, the processor 220 may obtain a facial image through the camera 270 at the time of illumination of the flood lighting device 280-1 based on the image obtaining order and then obtain a depth image through the camera 270 at the time of illumination of the structure lighting device 280-2. For example, the processor 220 may obtain a depth image through the camera 270 at the time of illumination of the structure lighting device 280-2 based on the image obtaining order and then obtain a facial image through the camera 270 at the time of illumination of the flood lighting device 280-1.

The electronic device may determine whether biometric scanning using the facial image succeeds in operation 609. For example, the processor 220 may perform biometric scanning based on biometric information (e.g., iris or face) obtained from the facial image obtained through the camera 270. The processor 220 may determine whether biometric scanning succeeds based on the similarity between the biometric information obtained from the facial image and reference biometric information stored in the memory 230.

When biometric scanning succeeds ('Yes' in operation 609), the electronic device may detect the user's gaze vector based on the facial image and the depth image in operation 611. For example, the processor 220 may produce a gaze vector corresponding to a change in the user's gaze using eye-gaze tracking based on the facial image and depth image obtained in operation 607.

The electronic device may identify whether the user's gaze vector matches movement information about the gaze object in operation 613. For example, when the similarity between the movement information about the gaze object and the user's gaze vector detected through gaze-tracking exceeds a reference value, the processor 220 may determine that the user's gaze vector matches the movement information about the gaze object. When the similarity between the movement information about the gaze object and the user's gaze vector is the reference value or less, the processor 220 may determine that the user's gaze vector does not match the movement information about the gaze object.

Upon determining that the user's gaze vector does not match the movement information about the gaze object ('No' in operation 613), the electronic device may update the gaze object in operation 617. For example, upon determining that the user's gaze vector does not match the movement information about the gaze object, the processor 220 may determine that the user's biometric information used for biometric scanning has not been obtained from the actual user. Therefore, the processor 220 may update the position of the gaze object to re-identify whether the object attempting user authentication is the actual user.

When biometric scanning fails ('No' in operation 609) or the gaze object is updated (operation 617), the electronic device may identify the time of obtaining a next image based on the image obtaining pattern randomly generated. When the next image obtaining time arrives, the electronic device may obtain a facial image and a depth image based on the order of obtaining images of the image obtaining pattern randomly generated, in operation 607. For example, the electronic device may repetitively perform a series of operations for user authentication (e.g., operations 607 to 613 and operations 617 to 619).

Upon determining that the user's gaze vector matches the movement information about the gaze object ('Yes' in operation 613), the electronic device may determine that user authentication succeeds in operation 615.

According to an embodiment, when user authentication fails a reference number of times or during a reference time, the electronic device may output information related to authentication failure. The authentication failure-related information may be output in the form of any one of a message, sound, or indicator (LED). When user authentication fails, the electronic device may remain locked. Here, failure in user authentication may include the circumstance where biometric scanning fails in operation 609 of FIG. 6 or the circumstance where it is determined in operation 613 that the user's gaze vector does not match the movement information about the gaze object.

According to an embodiment, the electronic device 100 may perform, in parallel, a biometric scanning operation (e.g., operation 609) using a facial image and the operation of determining whether the user's gaze vector matches the movement of the gaze object (e.g., operations 611 to 613). When biometric scanning succeeds, and the user's gaze vector matches the movement of the gaze object, the electronic device 100 may determine that user authentication succeeds.

According to an embodiment, upon determining that the user's gaze vector matches the movement of the gaze object (e.g., operations 611 to 613), the electronic device 100 may perform biometric scanning (e.g., operation 609).

Figure 8:
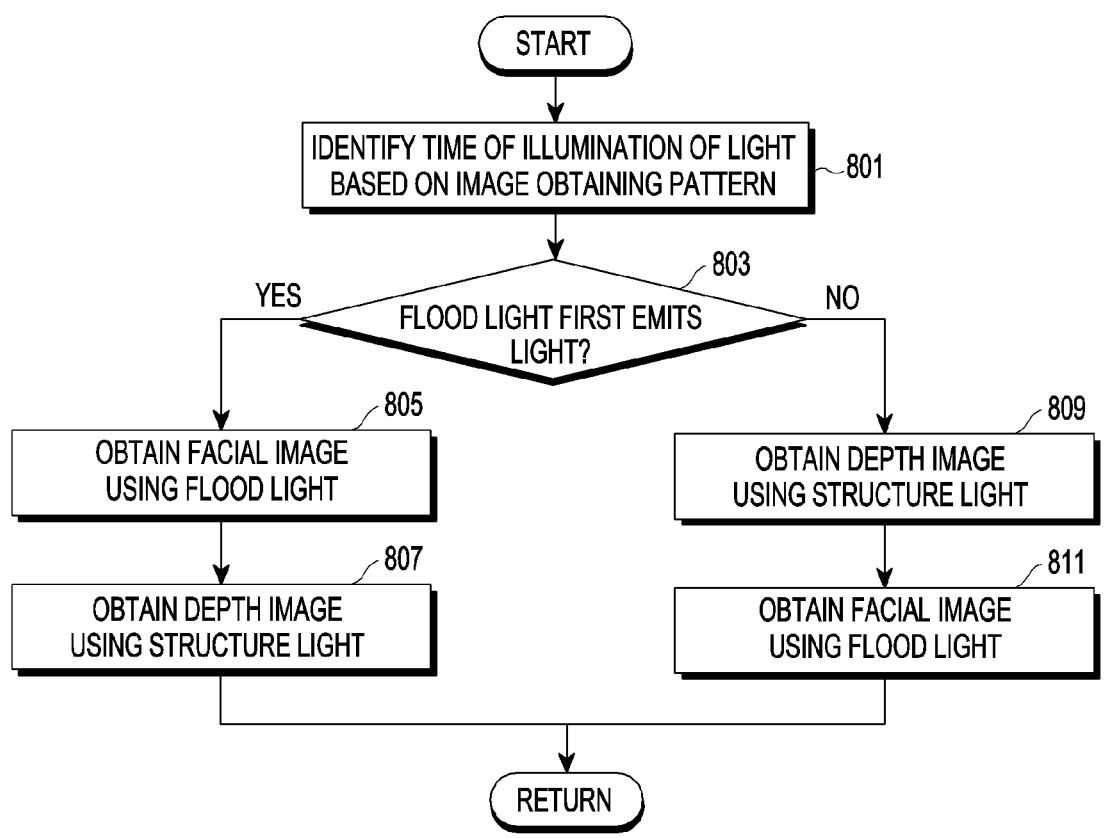
FIG. 8 illustrates a flowchart of an example of obtaining an image by an electronic device according to an embodiment.

FIG. 8 illustrates a flowchart of an example of obtaining an image by an electronic device according to an embodiment. The following description may encompass the operation of obtaining a facial image and a depth image in operation 607 of FIG. 6. In the following description, the electronic device may include the electronic device 100 of FIG. 2 or at least part (e.g., the processor 220) of the electronic device 100.

Referring to FIG. 8, when an image obtaining pattern is randomly generated (e.g., operation 605 of FIG. 6), the electronic device may identify the times of illumination of the lighting devices based on the image obtaining pattern in operation 801.

The electronic device may determine whether the flood lighting device first emits light based on the times of illumination of the lighting devices in operation 803.

Upon determining that the flood lighting device first emits light ('Yes' in operation 803), the electronic device may obtain a facial image using the flood lighting device in operation 805. For example, the camera 270 may obtain an image (facial image) at the time of illumination of the flood lighting device 280-1 based on the image obtaining pattern randomly generated.

The electronic device may obtain a depth image using the structure lighting device in operation 807. For example, the camera 270 may obtain a depth image at the time of illumination of the structure lighting device 280-2 based on the image obtaining pattern randomly generated.

Upon determining that the structure lighting device first emits light ('No' in operation 803), the electronic device may obtain a depth image using the structure lighting device in operation 809. For example, the camera 270 may identify the time of illumination of the structure lighting device 280-2 based on a sync signal received from the structure lighting device 280-2 or the processor 220. The camera 270 may obtain a depth image at the time of illumination of the structure lighting device 280-2.

The electronic device may obtain a facial image using the flood lighting device in operation 811. For example, the camera 270 may identify the time of illumination of the flood lighting device 280-1 based on a sync signal received from the flood lighting device 280-1 or the processor 220. The camera 270 may obtain an image (facial image) at the time of illumination of the flood lighting device 280-1.

According to an embodiment, the electronic device may sequentially obtain the facial image and the depth image based on the times of obtaining the images of the image obtaining pattern randomly generated.

Figure 9:
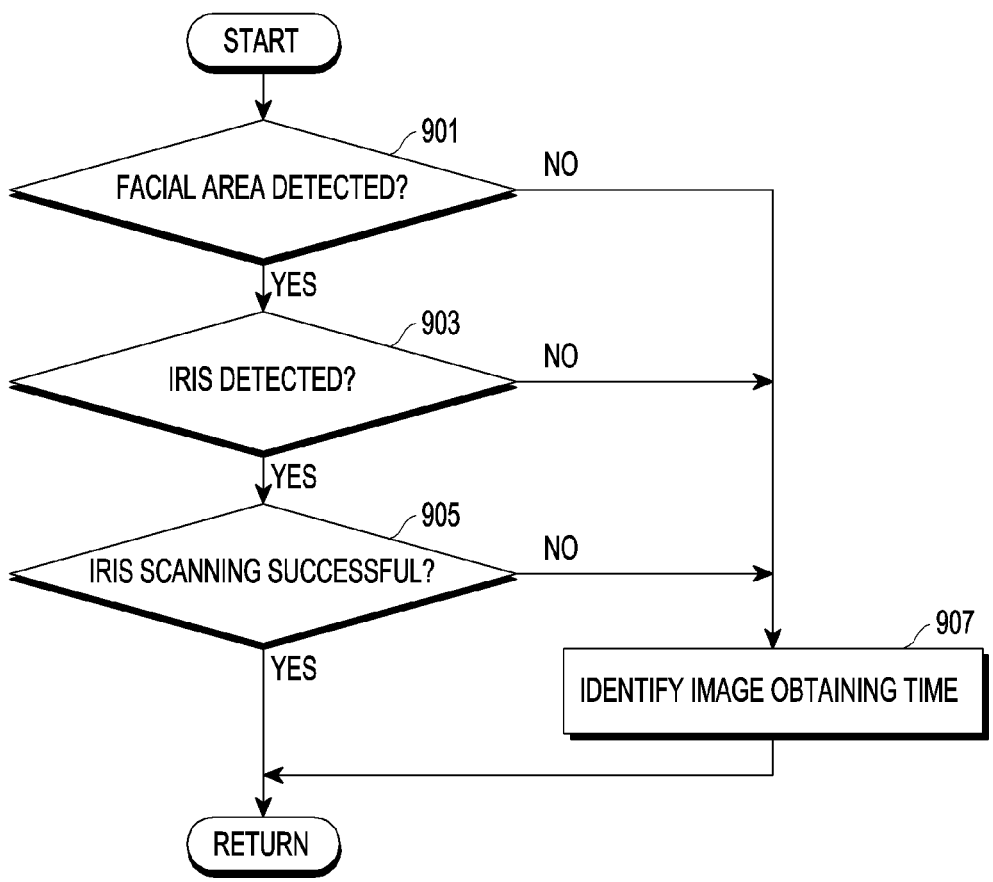
FIG. 9 illustrates a flowchart of an example of performing iris scanning on an electronic device according to an embodiment.

FIG. 9 illustrates a flowchart of an example of performing iris scanning on an electronic device according to an embodiment. The following description may encompass the operation of determining whether biometric scanning succeeds in operation 609 of FIG. 6. In the following description, the electronic device may include the electronic device 100 of FIG. 2 or at least part (e.g., the processor 220) of the electronic device 100.

Referring to FIG. 9, upon obtaining a facial image and a depth image (e.g., operation 607 of FIG. 6), the electronic device may identify whether a facial area is detected based on feature points in the facial image in operation 901. For example, the processor 220 may identify whether an area including feature points corresponding to a person's eyes, nose, and mouth is detected from the facial image.

When a facial area is detected from the facial image ('Yes' in operation 901), the electronic device may identify whether an iris image is detected from the facial area in operation 903.

Upon detecting an iris image from the facial area in the facial image ('Yes' in operation 903), the electronic device may determine whether biometric scanning on the user using the iris image succeeds in operation 905. For example, the processor 220 may perform iris scanning based on the similarity between the iris image detected from the facial image and at least one reference iris image stored in the memory 230. When there is a reference iris image with a similarity in iris image exceeding the reference value, the processor 220 may determine that iris scanning on the user succeeds.

When no facial area is detected from the facial image ('No' in operation 901), no iris image is detected from the facial area ('No' in operation 903), or biometric scanning using an iris image detected from the facial image fails ('No' in operation 905), the electronic device may identify the time of obtaining a next image based on the image obtaining pattern randomly generated, in operation 907. For example, the processor 220 may identify whether the next image obtaining time arrives based on the image obtaining pattern randomly generated in operation 605 of FIG. 6, as in operation 619 of FIG. 6.

According to an embodiment, upon determining that iris scanning succeeds in operation 905 ('Yes' in operation 905), the electronic device may identify whether the iris image used for iris scanning has been obtained from the actual user. For example, the electronic device may perform operations 611 to 613 of FIG. 6.

Figure 10:
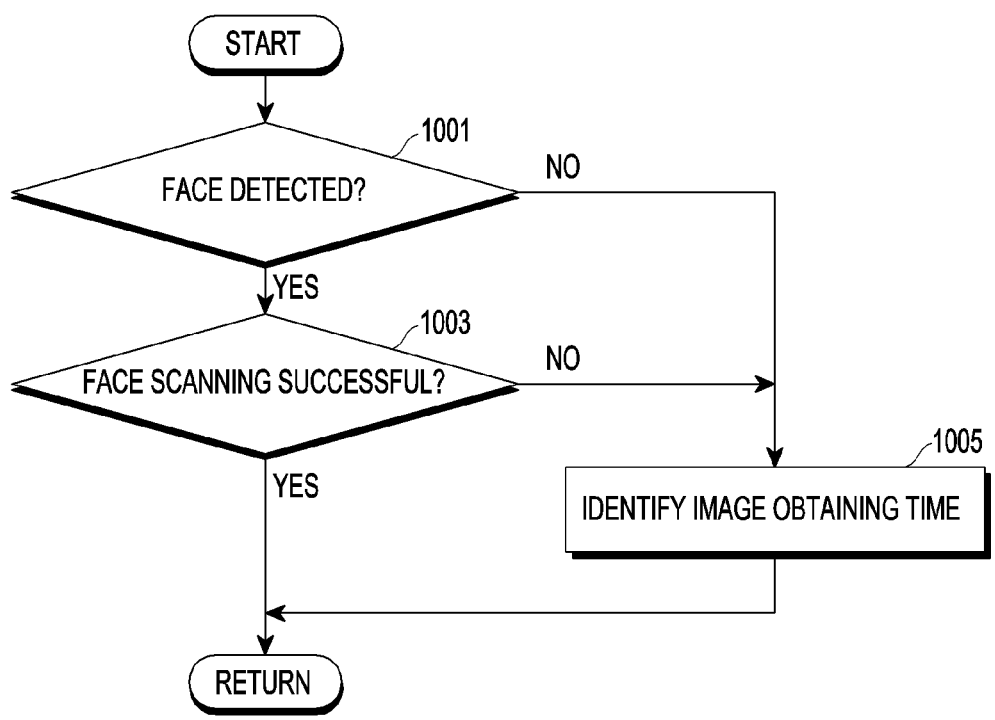
FIG. 10 illustrates a flowchart of an example of performing face scanning on an electronic device according to an embodiment.

FIG. 10 illustrates a flowchart of an example of performing face scanning on an electronic device according to an embodiment. The following description may encompass the operation of determining whether biometric scanning succeeds in operation 609 of FIG. 6. In the following description, the electronic device may include the electronic device 100 of FIG. 2 or at least part (e.g., the processor 220) of the electronic device 100.

Referring to FIG. 10, upon obtaining a facial image and a depth image (e.g., operation 607 of FIG. 6), the electronic device may identify whether the user's face is detected based on feature points in the facial image in operation 1001. For example, the processor 220 may identify whether feature points corresponding to a person's eyes, nose, and mouth are detected from the facial image.

Upon detecting the user's face from the facial image ('Yes' in operation 1001), the electronic device may determine whether face scanning on the user succeeds in operation 1003. For example, the processor 220 may perform face scanning based on the similarity between a feature point of the user's face detected from the facial image and at least one reference facial image stored in the memory 230. When there is a reference facial image with a similarity to the feature point of the user's face detected from the facial image exceeding the reference value, the processor 220 may determine that face scanning on the user succeeds. Here, the facial feature points may include, e.g., the inter-eye interval, the contour of the face, and the distance between the nose and the lips detected based on the feature points of the facial image.

When no user face is detected from the facial image ('No' in operation 1001), or biometric scanning on the user's face detected from the facial image fails ('No' in operation 1003), the electronic device may identify the time of obtaining a next image based on an image obtaining pattern randomly generated, in operation 1005. For example, the processor 220 may identify whether the next image obtaining time arrives based on the image obtaining pattern randomly generated in operation 605 of FIG. 6, as in operation 619 of FIG. 6.

According to an embodiment, upon determining that face scanning succeeds in operation 1003 ('Yes' in operation 1003), the electronic device may identify whether the user's facial image used for face scanning has been obtained from the actual user. For example, the electronic device may perform operations 611 to 613 of FIG. 6.

Figure 11:
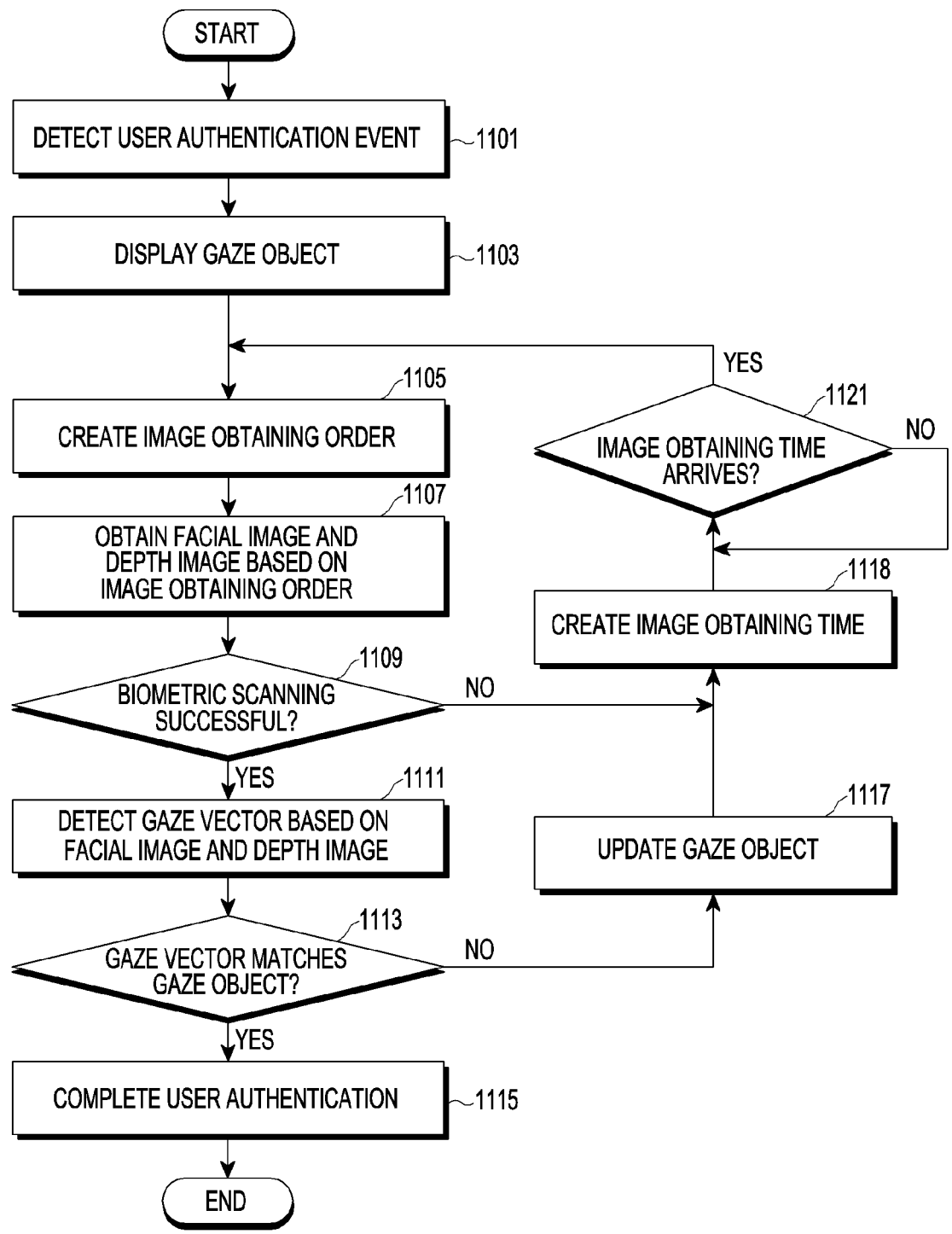
FIG. 11 illustrates a flowchart of an example of user authentication on an electronic device according to an embodiment.

FIG. 11 illustrates a flowchart of an example of user authentication on an electronic device according to an embodiment. FIG. 12 illustrates a view of a screen configuration for face scanning on an electronic device according to an embodiment. In the following description, the electronic device may include the electronic device 100 of FIG. 2 or at least part (e.g., the processor 220) of the electronic device 100.

Referring to FIG. 11, the electronic device may detect an occurrence of a user authentication event in operation 1101. The occurrence of the user authentication event may be detected based on at least one of entry of the power button, reception of an activation command (e.g., a voice command), a grabbing state of the electronic device 100, or a variation in the charging state of the electronic device 100.

Figure 12A:
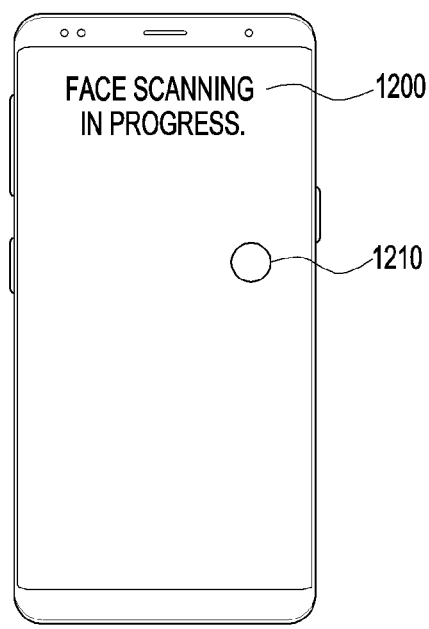
FIGS. 12A and 12B illustrate views of screen configurations for face scanning on an electronic device according to an embodiment.
Figure 12B:
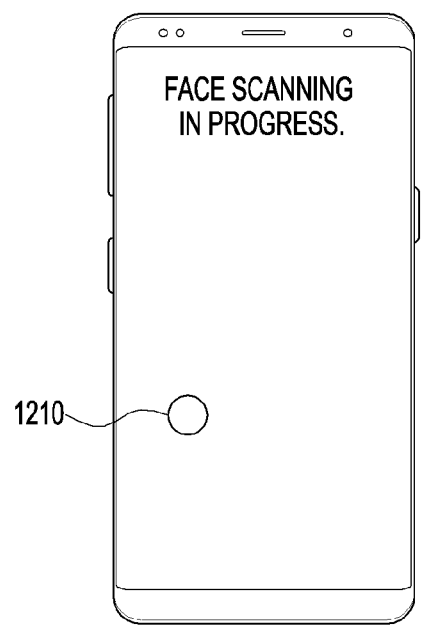

The electronic device may display a gaze object to lead the user's gaze in operation 1103. For example, when performing face scanning-based user authentication, the processor 220 may control the display 250 to display a gaze object 1210 and guide information 1200 for face scanning as shown in FIG. 12A. The processor 220 may apply an animation effect to the gaze object 1210 as shown in FIG. 12B. In other words, the gaze object 1210 may be moved randomly or as per a pre-determined rule.

The electronic device may randomly generate an image obtaining order for user authentication in operation 1105. The image obtaining order may include an order of obtaining the user's image (facial image) obtained using the flood lighting device 280-1 and a depth image obtained using the structure lighting device 280-2.

The electronic device may obtain a facial image and a depth image based on an image obtaining order randomly generated, in operation 1107. For example, the processor 220 may sequentially emit light through the flood lighting device 280-1 or the structure lighting device 280-2 according to the image obtaining order, thereby sequentially obtaining the facial image and the depth image.

The electronic device may determine whether biometric scanning using the facial image succeeds in operation 1109. For example, the processor 220 may perform iris scanning or face scanning using the facial image obtained through the camera 270.

When biometric scanning succeeds ('Yes' in operation 1109), the electronic device may detect the user's gaze vector based on the facial image and the depth image in operation 1111. For example, the processor 220 may detect a 3D face mesh based on the depth image and a facial area detected from the facial image. The processor 220 may produce a gaze vector corresponding to a change in the user's gaze using the 3D face mesh and the facial image. Here, the user's gaze vector may include information about at least one of the direction, distance, or speed of movement of the user's gaze.

The electronic device may identify whether the user's gaze vector matches movement information about the gaze object in operation 1113. For example, when the similarity between the movement information about the gaze object and the user's gaze vector exceeds a reference value, the processor 220 may determine that the user's gaze vector does not match the movement information about the gaze object. When the similarity between the movement information about the gaze object and the user's gaze vector is the reference value or less, the processor 220 may determine that the user's gaze vector does not match the movement information about the gaze object.

Upon determining that the user's gaze vector does not match the movement information about the gaze object ('No' in operation 1113), the electronic device may update the position of the gaze object in operation 1117. For example, upon determining that the user's gaze vector does not match the movement information about the gaze object, the processor 220 may control the display 250 to change the position of the virtual object so as to re-identify whether the object attempting user authentication is the actual user.

When biometric scanning fails ('No' in operation 1109) or the position of the gaze object is updated (operation 1117), the electronic device may randomly generate an image obtaining time in operation 1119. The image obtaining time may include a time for re-obtaining the user's image for user authentication.

The electronic device may identify whether the image obtaining time randomly generated arrives in operation 1121. When the image obtaining time arrives, the electronic device may randomly generate an image obtaining order for user authentication in operation 1105. For example, the electronic device may repetitively perform a series of operations for user authentication (e.g., operations 1105 to 1113 and operations 1117 to 1121).

Upon determining that the user's gaze vector matches the movement information about the gaze object ('Yes' in operation 1113), the electronic device may determine that user authentication succeeds in operation 1115. For example, upon determining that the user's gaze vector matches the movement information about the gaze object, the processor 220 may determine that the biometric information used for biometric authentication has been obtained from the actual user. Therefore, the processor 220 may determine that user authentication using biometric information succeeds.

According to an embodiment, when user authentication fails a reference number of times or during a reference time, the electronic device may determine that user authentication fails. In this case, the electronic device may output the authentication failure-related information in the form of any one of a message, sound, or indicator (LED).

FIGS. 13A, 13B, 13C, 13D, and 13E illustrate views of times of illumination of a flood lighting device and a structure lighting device and times of image capture according to an embodiment.

Referring to FIGS. 13A to 13E, the electronic device 100 may randomly set the time of obtaining an image and the time of illumination of a lighting device to enhance the security of user authentication using biometric information. The image obtaining time and the light illumination time may match each other. For example, the user's facial image may be obtained through the camera 270 at the time of illumination of the flood lighting device 280-1, and a depth image may be obtained through the camera 270 at the time of illumination of the structure lighting device 280-2.

Figure 13A:
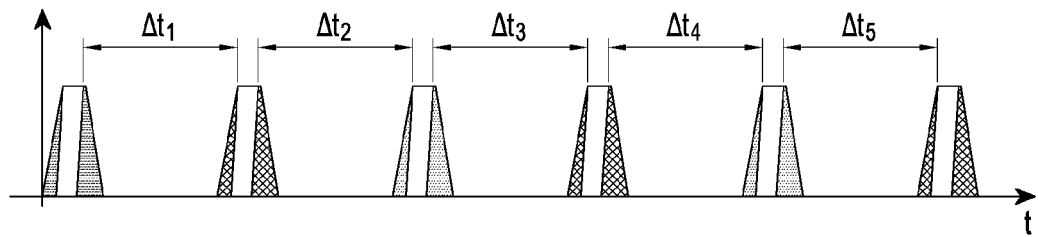
FIGS. 13A, 13B, 13C, 13D, and 13E illustrate views of times of illumination of a flood lighting device and a structure lighting device and times of image capture according to an embodiment.

According to an embodiment, the electronic device 100 may alternately set times of illumination of the flood lighting device 280-1 and times of illumination of the structure lighting device 280-2 as shown in FIG. 13A. The intervals between the times of illumination of the lighting devices may be set to be equal to each other ($\Delta t1=\Delta t2=\Delta t3=\Delta t4=\Delta t5$).

Figure 13B:
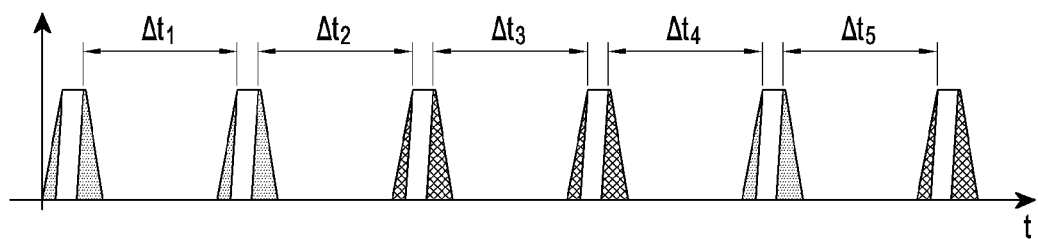

According to an embodiment, the electronic device 100 may set the times of illumination of the lighting devices so that the flood lighting device 280-1 or the structure lighting device 280-2 consecutively emits light as shown in FIG. 13B. As an example, the electronic device 100 may set the times of illumination of the lighting devices so that the flood lighting device 280-1 emits light two consecutive times and the structure lighting device 280-2 emits light two consecutive times. The intervals between the times of illumination of the lighting devices may be set to be equal to each other ($\Delta t1=\Delta t2=\Delta t3=\Delta t4=\Delta t5$).

Figure 13C:
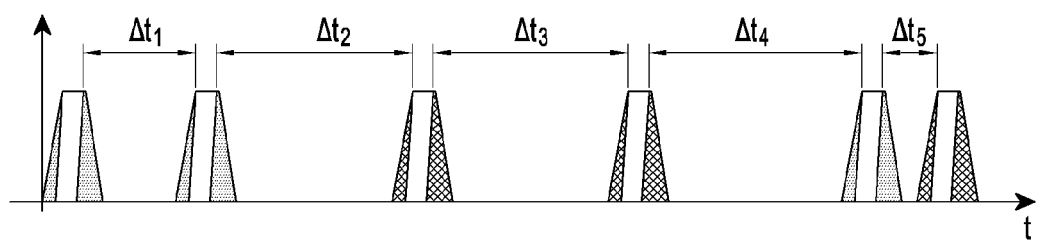

According to an embodiment, the electronic device 100 may set the times of illumination of the lighting devices so that the flood lighting device 280-1 or the structure lighting device 280-2 consecutively emits light as shown in FIG. 13C. As an example, the electronic device 100 may set the times of illumination of the lighting devices so that the flood lighting device 280-1 emits light two consecutive times and the structure lighting device 280-2 emits light two consecutive times. However, the intervals between the times of illumination of the lighting devices may be set to be different from each other ($\Delta t1 \neq \Delta t2 \neq \Delta t3 \neq \Delta t4 \neq \Delta t5$).

Figure 13D:
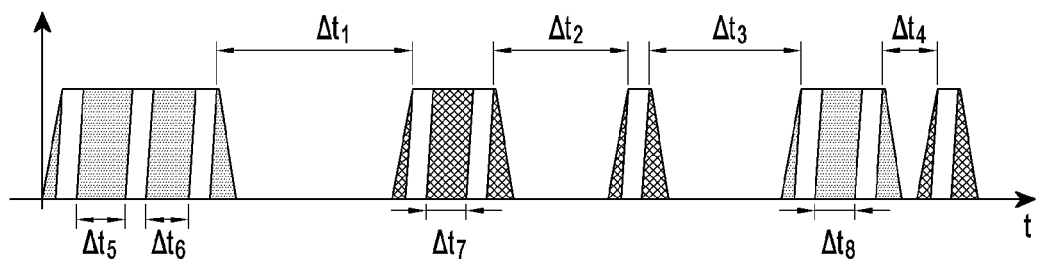

According to an embodiment, the electronic device 100 may set the times of illumination of the lighting devices so that the same type of lighting device steadily emits light until a burst shot is complete, as shown in FIG. 13D. As an example, the electronic device 100 may set the times of illumination of the lighting devices so that the illumination of the flood lighting device 280-1 or the structure lighting device 280-2 is maintained until a burst shot is complete. To obtain different images, the intervals between the times of illumination of the lighting devices may be set to be different from each other ($\Delta t1 \neq t2 \neq \Delta t3 \neq \Delta t4$). The intervals between the times of illumination of the lighting devices may be set to be equal to each other while a burst shot is being taken ($\Delta t5=\Delta t6=\Delta t7=\Delta t8$).

Figure 13E:
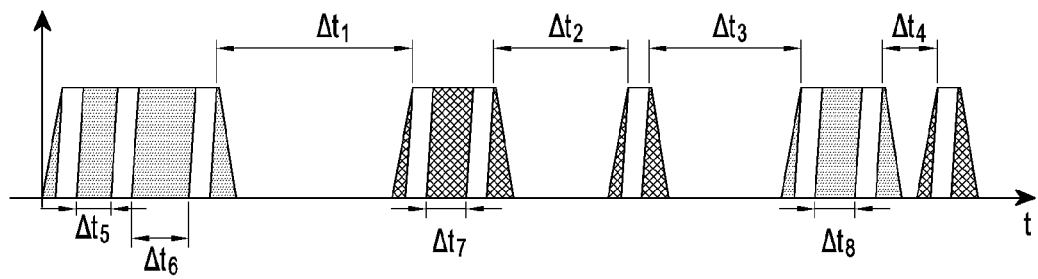

According to an embodiment, the electronic device 100 may set the times of illumination of the lighting devices so that the same type of lighting device steadily emits light until a burst shot is complete, as shown in FIG. 13e. In this case, the intervals between the times of illumination of the lighting devices may be set to be different from each other ($\Delta t1 \neq \Delta t2 \neq \Delta t3 \neq \Delta t4$, $\Delta t5 \neq \Delta t6 \neq \Delta t7 \neq \Delta t8$).

According to an embodiment, when the flood lighting device and the structure lighting device consecutively emit light based on the image obtaining pattern randomly generated, the electronic device 100 may have a delay in obtaining an image due to the time of switching between the lighting devices. Thus, the electronic device 100 may set the times of illumination of the lighting devices as shown in FIG. 14 to minimize a delay in obtaining an image.

Figure 14:
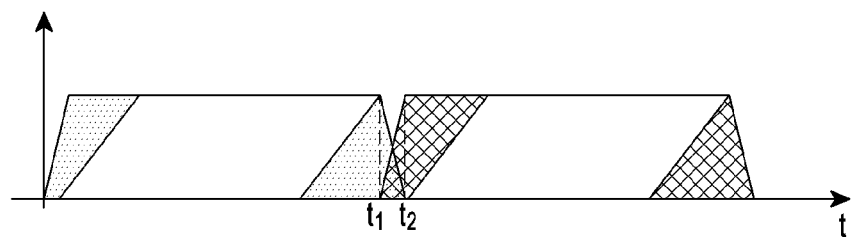
FIG. 14 illustrates a view of times of switch of a camera according to an embodiment.

FIG. 14 illustrates a view of times of switch of a camera according to an embodiment.

Referring to FIG. 14, the camera 270 may obtain a first image (e.g., a facial image) based on the illumination of a first lighting device (e.g., the flood lighting device 280-1). The first lighting device may terminate the illumination at the time t1 of completion of capturing the first image. A second lighting device (e.g., the structure lighting device 280-2) may start to emit light simultaneously with the termination of illumination of the first lighting device at the time t1 of completion of capturing the first image. The camera 270 may start to capture a second image (e.g., a depth image) if a protection period according to the illumination of the second lighting device elapses (t2).

According to an embodiment of the disclosure, at least a part of the device (e.g., modules or their functions) or method (e.g., operations) may be implemented as instructions stored in a computer-readable storage medium (e.g., the memory 230), e.g., in the form of a program module. The instructions, when executed by a processor (e.g., the processor 220), may enable the processor to carry out a corresponding function. The computer-readable medium may include, e.g., a hard disk, a floppy disc, a magnetic medium (e.g., magnetic tape), an optical recording medium (e.g., CD-ROM, DVD, a magnetic-optical medium (e.g., floptical disk), or an embedded memory. The instruction may include a code created by a compiler or a code executable by an interpreter. Modules or programming modules in accordance with various embodiments of the disclosure may include at least one or more of the aforementioned components, omit some of them, or further include other additional components.

Operations performed by modules, programming modules or other components in accordance with various embodiments of the disclosure may be carried out sequentially, in parallel, repeatedly or heuristically, or at least some operations may be executed in a different order or omitted or other operations may be added.

As is apparent from the foregoing description, according to the embodiments of the disclosure, the electronic devices and operation methods thereof may obtain biometric information (e.g., iris information or face information) for user authentication using light sources randomly emitting light (e.g., a flood light and a structure light), preventing other users (e.g., hackers) from previously recognizing the random times of obtaining the biometric information and hence providing increased security for biometrics.

According to the embodiments of the disclosure, the electronic devices and operation methods thereof may determine whether biometric information has been obtained from the actual user based on the user's gaze changes when performing user authentication based on biometric information obtained using lights randomly emitting light (e.g., a flood light and a structure light), thereby preventing illegal user authentication using copied biometric information and hence providing increased security for biometrics.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
 a plurality of lighting devices;
 a camera;
 a display; and
 a processor configured to:
  display an object on the display,
  obtain, through the camera, a plurality of images based on an image obtaining pattern randomly generated,
  control a first lighting device, among the plurality of lighting devices, to emit light at a first time and a second lighting device, among the plurality of lighting devices, to emit light at a second time based on the image obtaining pattern randomly generated, obtain, through the camera, an image of a user at the first time when the first lighting device emits light and a depth image at the second time when the second time when the second lighting device emits light, obtain biometric information using at least one of the plurality of images, obtain information about a variation in a gaze of the user corresponding to a movement of the object displayed on the display using the plurality of images, and perform authentication on the user based on the biometric information and the user gaze variation information.

2. The electronic device of claim 1, wherein the processor is configured to obtain the biometric information of the user using the image of the user.

3. The electronic device of claim 1, wherein the processor is configured to obtain the user gaze variation information corresponding to the movement of the object displayed on the display using the image of the user and the depth image.

4. The electronic device of claim 1, wherein the first lighting device includes a flood lighting device, and the second lighting device includes a structure lighting device.

5. The electronic device of claim 1, wherein the first lighting device and the second lighting device are configured to use an infrared wavelength.

6. The electronic device of claim 1, wherein the processor is configured to identify that the user authentication succeeds when biometric scanning using the biometric information succeeds and the user gaze variation information matches the movement of the object displayed on the display.

7. The electronic device of claim 1, wherein the processor is configured to identify that the user authentication fails when biometric scanning using the biometric information fails or the user gaze variation information does not match the movement of the object displayed on the display, or when the biometric scanning using the biometric information fails and the user gaze variation information does not match the movement of the object displayed on the display.

8. The electronic device of claim 1, wherein the processor is configured to display the object on at least part of the display upon detecting an occurrence of a user authentication event.

9. The electronic device of claim 1, wherein the biometric information includes at least one of iris information or face information.

10. A method for operating an electronic device, the method comprising:

displaying an object on a display of the electronic device;

obtaining a plurality of images based on an image obtaining pattern randomly generated;

obtaining biometric information using at least one of the plurality of images;

obtaining information about a variation in a gaze of a user corresponding to a movement of the object displayed on the display using the plurality of images; and performing authentication on the user based on the biometric information and the user gaze variation information, wherein obtaining the plurality of images includes:

obtaining an image of the user at a first time when a first lighting device, among a plurality of lighting devices, functionally connected with the electronic device, emits light based on the image obtaining pattern randomly generated, and obtaining a depth image at a second time when a second lighting device, among the plurality of lighting devices, emits light.

11. The method of claim 10, wherein displaying the object includes displaying the object on at least part of the display upon detecting an occurrence of a user authentication event.

12. The method of claim 10, wherein obtaining the biometric information includes obtaining the biometric information of the user from the image of the user.

13. The method of claim 10, wherein obtaining the user gaze variation information includes obtaining the information about the variation in the gaze of the user corresponding to the movement of the object displayed on the display using the image of the user and the depth image.

14. The method of claim 10, wherein the first lighting device includes a flood lighting device, and the second lighting device includes a structure lighting device.

15. The method of claim 10, wherein performing the user authentication includes identifying that the user authentication succeeds when biometric scanning using the biometric information succeeds and the user gaze variation information matches the movement of the object displayed on the display.

16. The method of claim 10, wherein performing the user authentication includes identifying that the user authentication fails when biometric scanning using the biometric information fails or the user gaze variation information does not match the movement of the object displayed on the display, or when the biometric scanning using the biometric information fails and the user gaze variation information does not match the movement of the object displayed on the display.

17. The method of claim 10, wherein the biometric information includes at least one of iris information or face information.

* * * * *